(12) United States Patent  
Mampaey

(10) Patent No.: US 9,462,334 B2
(45) Date of Patent: Oct. 4, 2016

(54) PROGRAM SWITCH DISPLAY CONTROL ON AN AUDIO-VIDEO RENDERING DEVICE

(71) Applicant: Alcatel Lucent, Boulogne Billancourt (FR)

(72) Inventor: Marcel Mampaey, Brussels (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/378,457

(22) PCT Filed: Feb. 11, 2013

(86) PCT No.: PCT/EP2013/052636
§ 371 (c)(1),
(2) Date: Aug. 13, 2014

(87) PCT Pub. No.: WO2013/120788
PCT Pub. Date: Aug. 22, 2013

(65) Prior Publication Data
US 2015/0012943 A1  Jan. 8, 2015

(30) Foreign Application Priority Data
Feb. 16, 2012 (EP) .................................... 12305173

(51) Int. Cl.
*H04N 7/16* (2011.01)
*H04N 21/438* (2011.01)
(Continued)

(52) U.S. Cl.
CPC ........ *H04N 21/4383* (2013.01); *H04H 20/106* (2013.01); *H04H 20/26* (2013.01); *H04N 21/26241* (2013.01); *H04N 21/4331* (2013.01); *H04N 21/812* (2013.01); *H04N 5/50* (2013.01)

(58) Field of Classification Search
USPC .................. 725/38–39, 36, 88, 93, 100, 102
See application file for complete search history.

(56) References Cited

U.S. PATENT DOCUMENTS 6,115,057 A    9/2000   Kwoh et al.
7,636,928 B2   12/2009  Uno
(Continued)

FOREIGN PATENT DOCUMENTS

CA    2 291 426 A1   5/2001
EP    1 657 918 A1   5/2006
(Continued)

OTHER PUBLICATIONS

International Search Report for PCT/EP2013/052636 dated Mar. 8, 2013.

*Primary Examiner* — Mulugeta Mengesha
(74) *Attorney, Agent, or Firm* — Fay Sharpe, LLP

(57) ABSTRACT

A method and control device for controlling the display of multimedia data on an audio-video rendering device, e.g. a TV device (AVD), when a channel selection navigation, from a first channel to a second channel, is activated. It is controlled which, how and when particular multimedia data is displayed as it may for instance be necessary to perform parental control to prevent the display of "adult" multimedia data at particular times of the day, or advertisements at times when they could disturb the comfort of watching of the user of the TV set. In a preferred embodiment, multimedia data of a second content type, e.g. "normal" programs (PGS) or previews of programs (PRS) is displayed in replacement of the advertisements during a predetermined time delay called advertisement-play grace period.

10 Claims, 1 Drawing Sheet

(51) Int. Cl.
    *H04N 21/262*  (2011.01)
    *H04N 21/433*  (2011.01)
    *H04N 21/81*   (2011.01)
    *H04H 20/10*   (2008.01)
    *H04H 20/26*   (2008.01)
    *H04N 5/50*    (2006.01)

(56) References Cited

U.S. PATENT DOCUMENTS

| | | | |
|---|---|---|---|
| 8,707,359 B2* | 4/2014 | Prodan et al. | 725/38 |
| 2004/0261096 A1* | 12/2004 | Matz | H04N 7/163 725/28 |
| 2005/0240967 A1 | 10/2005 | Anderson et al. | |
| 2010/0122294 A1* | 5/2010 | Craner | 725/41 |
| 2010/0146540 A1 | 6/2010 | Sakamoto | |
| 2010/0162298 A1 | 6/2010 | Ahn | |
| 2011/0088061 A1 | 4/2011 | Rowe | |
| 2013/0014162 A1* | 1/2013 | Chen et al. | 725/38 |

FOREIGN PATENT DOCUMENTS

| | | |
|---|---|---|
| JP | 2002-057956 A | 2/2002 |
| JP | 2002-238044 A | 8/2002 |
| JP | 2002-268595 A | 9/2002 |
| JP | 2007-013568 A | 1/2007 |
| JP | 2009-033583 A | 2/2009 |
| JP | 2010-136222 A | 6/2010 |
| JP | 2010-148114 A | 7/2010 |
| WO | WO 97/42759 A1 | 11/1997 |
| WO | WO 99/52285 A1 | 10/1999 |
| WO | WO 2006/035406 A1 | 4/2006 |

* cited by examiner

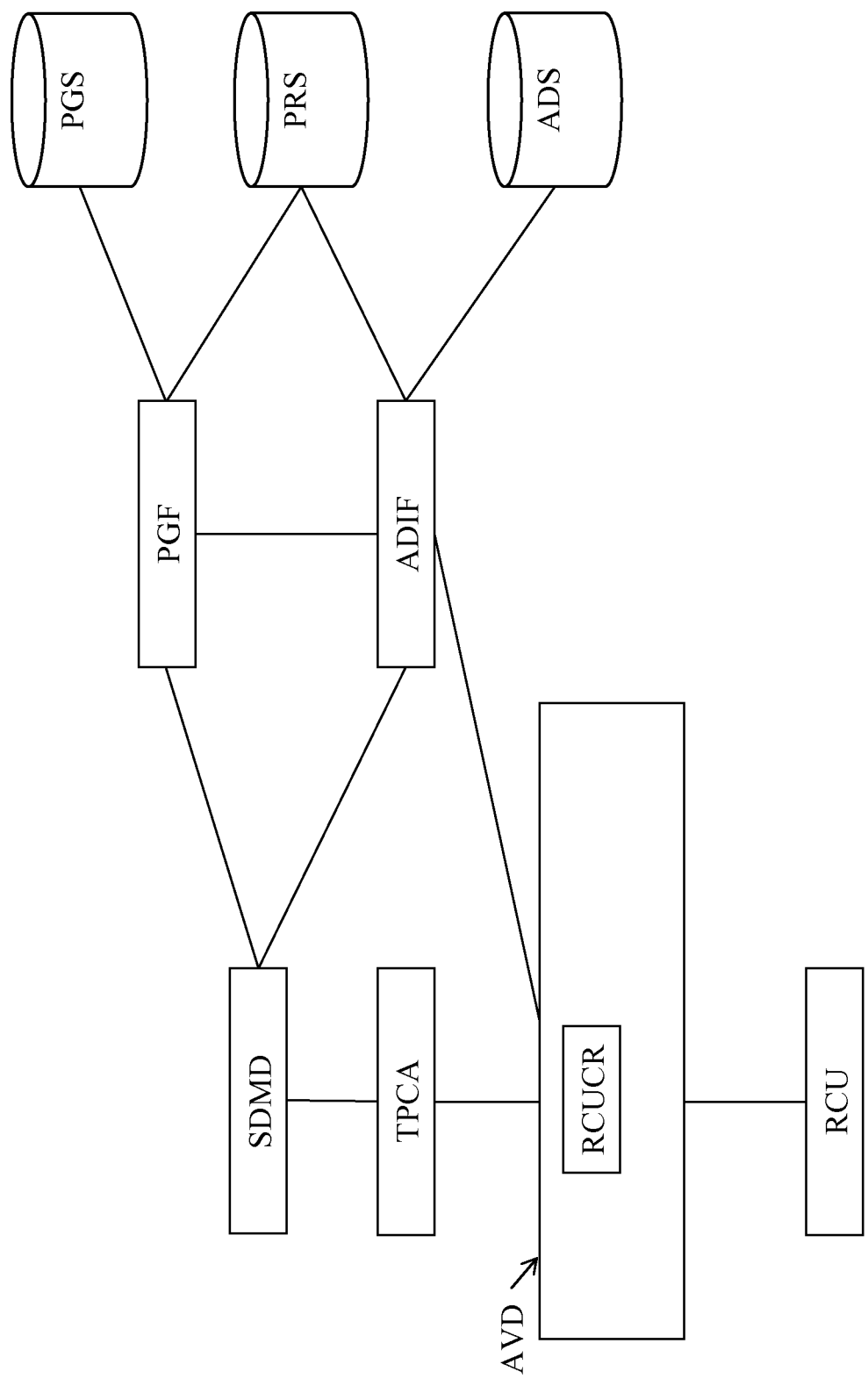

PROGRAM SWITCH DISPLAY CONTROL ON AN AUDIO-VIDEO RENDERING DEVICE

The present invention relates to a method to control the display of multimedia data on an audio-video rendering device when a channel selection navigation, from a first channel to a second channel, is activated by a trick play command associated to said rendering device, the multimedia data having a type of multimedia content and being transmitted on a channel received at said rendering device.

The consumer market is not only migrating from the old analog TV broadcast to digital TV broadcast, digital cable TV and IPTV, but also more and more to TV "Over The Top" over the Internet.

With this type of audio-video rendering device it may become important to control which, how and when particular multimedia data is displayed thereon. It may for instance be necessary to perform parental control to prevent the display of "adult" multimedia data at particular times of the day, or advertisements at times when they could disturb the comfort of watching of the user of the rendering device.

The present invention relates more particularly, but not exclusively, to advertisement as particular type of multimedia content of which the display should be prevented during a channel change operation, as will be explained in more detail below.

In old analog TV or digital TV broadcast without time-shift or home recording, it is always possible for a user to change channel in order to avoid advertisements or "ads", and this cannot be detected or prevented because there is no satisfactory technical solution to prevent advertisement skipping in analog TV.

In new digital solutions, there are often time-shift TV and/or home or networked digital video recorder functions available that make it even easier for the user to avoid watching any programmed advertisement as he/she can fast forward through the advertisements.

In the context of time-shift TV, the time shift function is perceived as an (almost) unconstrained time-gliding function, such that it comes as unnatural to disable the fast forward button when there are advertisements.

Similarly, when the user views content from the home digital video recorder, the device is perceived as similar to an old analog VHS video recorder (also called VCR) such that the fast forward button is perceived as providing complete liberty to skip the entirety of the programmed advertisements.

At the moment, in analog or digital TV broadcast without time-shift or recording there is no technical solution to prevent a user performing a channel selection navigation activated by the trick play command, e.g. via a remote control unit, to avoid watching advertisements, or any other multimedia data of a predetermined content type.

When a user is performing a channel selection navigation, the resulting channel change user experience may be altered by the presence of advertisements being played or displayed on the audio-video rendering device and preventing the user from discovering programs effectively and pleasantly.

At the current time, a user may be able to fast forward through advertisements when advertisements are being played instead of the expected channel during channel browsing but only when the channel is being watched in time shift mode or when the program is downloaded or recorded, otherwise the advertisements cannot be skipped. This prevents an effective and comfortable channel discovery and browsing through TV programs, and it lowers the user's quality of experience, especially during a channel selection navigation. Although the Electronic Program Guide EPG or mosaic display can provide live previous or currently displayed channels, the content feeds usually come from live TV programs such that a significant percentage of these feeds can be advertisements instead of actual program content, thereby preventing the user to make an efficient choice amongst the proposed programs.

On the other hand and although advertisements are needed to fund programs, in Over The Top OTT solutions or digital TV solutions program discovery is not easy and is made even harder when advertisements are played while the user performs a channel selection navigation in order to look for something to watch.

An object of the present invention is to provide a method wherein channel selection navigation is not altered by the display of multimedia data of a predetermined content type, e.g. advertisements or adult content, on the audio-video rendering device when a user is searching for a program to watch.

According to a characterizing embodiment of the present invention, this object is achieved due to the fact that said method comprises the steps of
- intercepting the activated trick play command,
- analyzing whether the intercepted trick play command activates a channel selection navigation,
- interpreting the multimedia data transmitted on said second channel if said intercepted trick play command activates a channel selection navigation, and
- preventing the multimedia data transmitted on said second channel to be displayed on said audio-video rendering device if the transmitted multimedia data is of said predetermined content type.

Owing to the fact that multimedia data of a predetermined content type, e.g. advertisements, is prevented to be displayed when a channel selection navigation is performed, the user may effectively and pleasantly look for and discover programs to watch. This improves the program search experience during a channel selection navigation performed by the user.

It is to be noted that the U.S. Pat. No. 6,115,057 of Kwoh, Daniel S. (La Canada/Flintridge, Calif.) and Mankovitz, Roy J. (Encino, Calif.), entitled "Apparatus and method for allowing rating level control of the viewing of a program" and published on Sep. 5, 2000 discloses an apparatus for allowing rating level control of the viewing of a program. The apparatus includes a device for entering a desired rating level for controlling the viewing of a program, a device for extracting rating data from a program video segment, the rating data indicating a rating level of the program video segment, and a device for extracting text data representative of the content of the program video segment from the program video segment. The apparatus includes a device for determining whether the extracted rating data indicates that the program video segment has an acceptable rating level for viewing with regard to the entered desired rating level and a device for blocking the playing of the program video segment if it is determined that the extracted rating data indicates that the program video segment has an unacceptable rating level for viewing with regard to the entered desired rating level. The apparatus further includes a device for substituting display of the extracted text data representative of the content of the program video segment for the blocked program video segment, if it is determined that the extracted rating data indicates that the program video segment has an unacceptable rating level for viewing with regard to the entered desired rating level.

This known document discloses a parental control solution where unacceptable rating is replaced with verbal description. In other words, the acceptability or unacceptability of the level rating, which is a technical aspect of the data transmitted on the second channel, is controlled. The present invention differentiates from the contents of this document in that the type of multimedia content then transmitted on the second channel is now verified, not the technical aspect or level rating.

This document thereby do not solve the problem of the present invention that is "to provide a method wherein channel selection navigation is not altered by the display of multimedia data of a predetermined content type, e.g. advertisements or adult content, on the audio-video rendering device when a user is searching for a program to watch", as indicated above.

It is also to be noted that the United States Patent Application US 2010/162298 A1 of AHN SUNG-WOOK [KR], entitled "METHOD AND APPARATUS FOR RECEIVING BROADCAST DATA" and published on Jun. 24, 2010 discloses a method of outputting broadcasting data, the method including outputting advertisement data to be provided in a first channel, when a request to change from the first channel to a second channel is received while the advertisement data is being provided, determining whether or not to change the channel according to information regarding the second channel, and selectively changing channels from the first channel to the second channel according to the decision.

This other known document discloses an advertisement solution preventing from zapping onto adverts, and caching/delaying. In more detail, this other document discloses a method that prevents to zap to the second channel when this second channel displays advertisements.

On the contrary, in the present invention, the zapping to the second channel is allowed anyway, only the display of advertisement on this second channel is changed.

Moreover, in this other document, the time at which advertisement is displayed on the second channel corresponds to a known time point, whilst in the present invention, the content of the second channel is analyzed in order to detect whether the multimedia data transmitted on this second channel is of a predetermined content type.

The present invention is therefore more flexible in the detection of advertisements.

It is also to be noted that the Patent Application WO 99/52285 A1 of DISCOVERY COMMUNICAT INC [US], entitled "TARGETED ADVERTISEMENT USING TELEVISION DELIVERY SYSTEMS" and published on Oct. 14, 1999 discloses a multiple channel architecture (265) designed to allow targeted advertising directed to television terminals (220) connected to an operations center (202) or a cable headend (208). Program channels carry television programs. The invention uses upstream data reception hardware (262, 275, 297), databases (301) and processing hardware (285, 293) and software to accomplish these functions. During commercial breaks in the television programs, advertisements, which are also broadcast on the program channel, are displayed. However, additional feeder channels carry alternate advertising that may be better suited for certain viewing audiences. The operations center (202) or the cable headend (208) generate a group assignment plan (293, 299) that assigns the television terminals (220) to groups, based on factors such as area of dominant influence and household income. A switching plan (291) is then generated that instructs the television terminals (220) to remain with the program channel or to switch to one of the alternate feeder channels during the program breaks. The television terminals (220) record which channels were viewed during the program breaks, and report this information to the cable headend (208) and the operations center (202). The reported information is used to generate billing for commercial advertisers, and to analyze viewer watching habits.

This other document mentions an often cited disclosure about dynamic target advertising also addressing log issues in the field.

Again, this other documents do not disclose nor teach the advantageous characteristic features of the present embodiment.

The other following documents are alternative solutions to the present invention. However, again they do not reach the advantageous characteristics thereof.

It is further to be noted that the Patent Application WO 2006/035406 A1 of KONINKL PHILIPS ELECTRONICS NV [NL]; PHILIPS CORP [US]; DOOMS JACOBUS [NL], entitled "SMART ZAPPER" and published on Apr. 6, 2006 discloses an entertainment system that includes a receiver having a tuner which is tunable to a various channels to receive various input signals. Therein, a controller is configured to generate a control signal to tune the tuner to a different channel. The controller detects an advertisement on the current channel, and generates the control signal to select a different channel in response to control criteria. The control criteria include similarity between the content programming of the current channel and the content programming of next channel to be tuned to. The similarity may be determined from analyzing the contents of the available channels, electronic program guide or metadata information included in the signal. The control criteria may also include the selected channel not having another advertisement. The control signal may be generated in response to detecting an advertisement on the current channel, or in response to a user action.

It is also to be noted that the Patent Application CA 2 291 426 A1 of BARRETT BRAD C [CA]; VASILAKOS JOHN ANDREW [CA], entitled "SYSTEM AND METHOD ENABLING ADVERTISERS TO ADVERTISE VIA A SYSTEM OF INTERACTIVE ADVERTISEMENT IMAGES EMBEDDED AND DISPLAYED WITHIN ADVANCED TELEVISION PROGRAMMING AND UTILIZED IN CONJUNCTION WITH ALTERNATE TELEVISION CHANNEL(S)" and published on May 26, 2001 discloses a method and system of commerce effectuating the advertising and marketing of consumer products through a system of advanced television advertising. The system comprises a system wherein interactive advertising images disruptive to the television viewing session are embedded within a television program in a manner whereby embedded image(s) appear within the visual field of a television program when viewed on an advanced television. In order for a viewer to remove the said image(s) from the visual field the viewer is required to interact with the image(s) via a viewer input device (e.g. remote control). Following the said viewer initiated interactive event the program containing the advertising image disappears from the visual field and a short advertising session is displayed during a latency period prior to the television re-tuning to the a television channel that does not contain advertising images. Once the returning process is completed a viewer is then able for a predetermined period of time to view the base television program uninterrupted by advertising images. The system operates via a system where multiple television signals are multiplexed together and transmitted to a viewer location via a communication network. The first multiplexed signal (Channel A) contains a base television program and embedded interactive advertising image(s), the second signal (Channel B) is encrypted and contains an identical version of the said base television program no advertising images. The third Channel (Channel C) contains an advertising sequence which may be interactive. When a viewer interacts with an image displayed on Channel A decryption and/or location identification code is produced while the television seamlessly re-tunes itself to channel C a short television commercial is displayed before file television re-tunes itself a second time to Channel B. During this procedure the identity of Channel A is stored by the processor and is used to re-tune to Channel A when the Channel B viewing session is terminated. The primary source of income for the system will be from advertiser(s) that utilize the system in order to advertise and market product(s) and/or services(s).

It is also to be noted that the United States Patent Application US 2011/088061 A1 of ROWE SIMON M [GB], entitled "DISPLAYING ADVERTISEMENTS ON BLANK TELEVISION OUTPUT" and published on Apr. 14, 2011 discloses methods, systems, and apparatus, including computer programs encoded on a computer storage medium, for providing television advertisements while a viewing device is tuning to a channel. In one aspect, a viewing device, in response to receiving a signal to tune to a channel, selects advertisement data for an advertisement from a data storage device storing advertisement data for one or more advertisements, and generates a video signal when tuning to the channel, the video signal generated only for the duration that the viewing device is tuning to the channel and for displaying on the television device, and the video signal causing the advertisement to be displayed on the television device.

It is also to be noted that the Patent Application WO 97/42759 A1 of OKTV INC [US], entitled "Intelligent and user friendly channel up/down control" and published on Nov. 13, 1997 discloses a technique for selectively inhibiting television receiving apparatus from displaying those television channels which are not authorized for viewing, such as unsubscribed television channels and channels with programs which satisfy predetermined content ratings criteria. Television channel information associated with television channels that are receivable by the television receiving apparatus, such as rating data representing the contents of the programs on the television channel, is obtained. A rating code representing the content ratings criteria of those channels which a viewer wishes to inhibit from being displayed also is obtained. When either channel up or channel down buttons are operated by the viewer, the rating data associated with the next television channel is compared with the rating code to determine if that television channel satisfies the predetermined content ratings criteria. If so, the channel is blocked and another channel having rating data which do not satisfy the predetermined content ratings criteria then is selected and the program broadcast thereon is displayed to permit the viewer to watch channels broadcasting acceptable television programs.

It is finally to be noted that the European Patent Application EP 1 657 918 A1 of CHO NAM-SHIN [KR], entitled "Method for providing information during a channel change in a digital broadcast receiver" and published on May 17, 2006 discloses a method for displaying video information in a digital broadcast receiver during a change from a current channel to a new channel is disclosed. The method is suitable for displaying video information such as an advertisement, information selected by the user, or a program guide.

A characterizing embodiment of the present invention is that said channel selection navigation consists in selecting an Electronic Program Guide EPG, in selecting a mosaic viewing of channels, or in switching to said second channel via said trick play command controlled by a user of said audio-video rendering device.

The channel selection navigation may use mechanisms such as program switching (or "zapping") or browsing through an Electronic Program Guide EPG or on a TV channels mosaic. Any such fast change of channel, short duration channel view, or simply accessing the Electronic Program Guide EPG or selecting any preview or mosaic viewing of channels or other similar content search features is considered as being the beginning of a channel selection navigation.

In a preferred characterizing embodiment of the present invention, said method further comprises the step of displaying on said audio-video rendering device multimedia data of a second content type in replacement of the multimedia data of said predetermined content type, said second content type being distinct from said predetermined content type.

The multimedia data of the second content type displayed in replacement of the multimedia data of the predetermined content type is for instance a recent past program playtime cached for this purpose or first seconds (or minutes) of playtime of such programs.

Another characterizing embodiment of the present invention is that said multimedia data of said second content type is displayed on said audio-video rendering device in replacement of the multimedia data of the predetermined content type, then transmitted on said second channel, during a predetermined time delay.

In case the predetermined content type of multimedia content is advertisement, the predetermined time delay is called "advertisement-play grace period".

Again another characterizing embodiment of the present invention is that said method comprises the step of allowing the multimedia data of said predetermined content type transmitted on said second channel to be displayed on said audio-video rendering device after a predetermined time delay.

As mentioned above, in case the predetermined content type of multimedia content is advertisement, it is to be noted that advertisements need to be played to fund programs. In other words, a predetermined quota of advertisements has to be played on each channel to guarantee the funding of programs played on that channel.

Therefore, instead of fully preventing the multimedia data of the predetermined content type, e.g. advertisements, transmitted on the second channel to be displayed on the audio-video rendering device, the display of advertisements play can start as soon as the user remains on the second channel longer than the predetermined timer delay, e.g. a number of minutes. This predetermined delay can be configured or adapted to the user's behavior.

The above mentioned known documents disclose methods either to try to get rid of multimedia data of the predetermined content type, e.g. commercials advertisements (user interest), or to force the user to watch it (broadcaster interest). However, the feature of first preventing the multimedia data of the predetermined content type to be display, and then to display it after a time delay is not disclosed nor taught in any of these documents.

The present invention further solves the problem of showing main content when zapping instead of, e.g., commercials, without conflicting with the interests of the broadcaster to have enough commercials shown in the end, as well as with the viewing comfort of the user.

Still another characterizing embodiment of the present invention is that the multimedia data transmitted on the channels is provided by servers, that the multimedia data of said predetermined content type is provided by a server of a first server type, and that the multimedia data of said second content type is provided by a server of a second server type.

These servers generally comprise a multimedia database that may for instance be a time-shift media storage or a special preview content multimedia database especially designed to provide effective program preview as multimedia data of the second content type to attract the user more easily to watch the second channel then selected. The multimedia database or at least the functional modules thereof may be deployed in the network, the ISP domain, the cloud, in customer premises infrastructures, or may even be deployed at more than one place.

The present invention also relates to a control device for controlling the display of multimedia data on an audio-video rendering device provided with a remote control unit, the multimedia data having a type of multimedia content and being transmitted on a channel received at said rendering device, said remote control unit being adapted to activate a channel selection navigation, from a first channel to a second channel, on said rendering device.

As for the above-mentioned method, an object of the present invention is to provide a control device whereby a channel selection navigation is not altered by the display of multimedia data of a predetermined content type, e.g. advertisements or adult content, on the audio-video rendering device when a user is searching for a program to watch.

According to a characterizing embodiment of the present invention, this object is achieved due to the fact that said control device comprises
  a remote control unit command receiver adapted to intercept actions of said remote control unit,
  a trick play command analyzer adapted to analyze whether the intercepted action of said remote control unit consists in activating a channel selection navigation,
  a search/discovery mode detector adapted to interpret the type of multimedia content transmitted on said second channel if said remote control unit has activated a channel selection navigation, and
  a multimedia content type controller adapted to prevent the multimedia data transmitted on said second channel to be displayed on said audio-video rendering device if the multimedia data transmitted on said second channel is of a predetermined content type.

It is to be noted that the control device of the invention is particularly adapted to operate according to the above-mentioned method of the present invention.

A characterizing embodiment of the present invention is that said control device further comprises a program feeder adapted to control the display on said audio-video rendering device of multimedia data of a second content type in replacement to the display of the multimedia data of said predetermined content type, said second content type of multimedia content being distinct from said predetermined content type of multimedia content.

In this way, the present control device shows all the advantageous features mentioned above in relation with the method of the invention.

In a preferred characterizing embodiment of the present invention, said program feeder is coupled to at least one server adapted to provide multimedia data of said second content type.

Further characterizing embodiments of the present method and control device are mentioned in the appended claims.

It is to be noticed that the terms "comprising" or "including", used in the claims, should not be interpreted as being restricted to the means listed thereafter. Thus, the scope of an expression such as "a device comprising means A and B" should not be limited to an embodiment of a device consisting only of the means A and B. It means that, with respect to embodiments of the present invention, A and B are essential means of the device.

Similarly, it is to be noticed that the term "coupled", also used in the claims, should not be interpreted as being restricted to direct connections only. Thus, the scope of the expression such as "a device A coupled to a device B" should not be limited to embodiments of a device wherein an output of device A is directly connected to an input of device B. It means that there may exist a path between an output of A and an input of B, which path may include other devices or means.

The above and other objects and features of the invention will become more apparent and the invention itself will be best understood by referring to the following description of an embodiment taken in conjunction with the accompanying FIGURE that shows different functional modules of the present method and control device using same.

When a user of an audio-video or Video PlayBack Rendering Device AVD such as a TV device, a PC, a Tablet, a NetBook, a Smartphone or any other audio-video rendering capable device performs a channel selection navigation, from a first channel to a second channel, this user expects to see the "normal" program then played on this second channel being displayed on the rendering device AVD.

However, it may happen that the second channel is then currently transmitting multimedia data of another predetermined content type instead of a normal program, say of a first type of multimedia content. This predetermined content type of multimedia content may for instance be advertisement or adult multimedia and should be prevented to be displayed at that time, at least for comfort reasons in watching for the normal program of the second channel.

As a consequence, it may become important to control which, how and when particular types of multimedia data are displayed on the audio-video rendering device AVD. This is the object of the present invention.

It is to be noted that the description hereafter more particularly relates to a method and a control device for preventing advertisement, as predetermined content type of multimedia content, to be displayed on the rendering device AVD when a second channel is selected after a channel selection navigation, but it should be clearly understood that the present invention is not limited to only control advertisement display.

It is also to be noted that the word "channel" must be understood in the broad sense as a set of programs or audio-video multimedia data provided by programs servers PGS, previews servers PRS and/or advertisements servers ADS such as, e.g., a TV Broadcaster (commonly called a "TV Channel") or an "Over The Top" OTT Service Provider over the Internet. The servers may comprise one or more multimedia databases for the provision of programs and/or advertisements to the user in the form of continuous audio-video multimedia data in real-time or in time-shift provisioning or with on-demand provisioning, via Cable or DSL or other means. In case of TV Broadcaster, the programs are transmitted by means of infrastructures such as Digital TV or IPTV or the Internet, whilst in case of OTT Service Provider, the programs are transmitted over the Internet.

The description below will be more specifically related to a TV device AVD as audio-video rendering device although the explanations are applicable to any other kind of audio-video rendering capable device.

The TV device AVD is provided with a remote control unit command receiver RCUCR receiving control signals from a remote control unit RCU. The remote control unit command receiver RCUCR exchanges information with a trick play command analyzer TPCA.

When the user initiates a trick play command on the remote control unit RCU for activating a channel selection navigation from a first channel to a second channel on the TV device AVD, this action is intercepted by the remote control unit command receiver RCUCR and transmitted to the trick play command analyzer TPCA.

The trick play command analyzer TPCA is responsible to react to the trick play commands, and is able to detect whether the action intercepted by the remote control unit command receiver RCUCR consists in activating a channel selection navigation.

The trick play command analyzer TPCA itself operates with a search/discovery mode detector SDMD. If the intercepted action activates a channel selection navigation, the search/discovery mode detector SDMD interprets the type of multimedia content then transmitted on the second channel.

If the multimedia data transmitted on the second channel is of a predetermined content type, e.g. advertisement ADS, a multimedia content type controller ADIF, coupled to the search/discovery mode detector SDMD, prevents this multimedia data of the predetermined content type ADS to be displayed on the TV device AVD.

The multimedia content type controller ADIF is coupled to the TV device AVD and has an advertisement control function with "advertisement-play grace period" mode as will be explained below.

The multimedia content type controller ADIF is coupled to at least one advertisements server ADS and/or previews server PRS. The control device further comprises a program feeder PGF coupled to the search/discovery mode detector SDMD and to at least one programs server PGS and/or previews server PRS able to provide multimedia data of the second content type, i.e. programs.

The program feeder PGF controls the multimedia content type controller ADIF to display multimedia data of the second content type, i.e. from the servers PGS or PRS, on the TV device AVD in replacement of the display of the multimedia data of the predetermined content type, i.e. from the server ADS, then transmitted on the second channel.

It is to be noted that advertisements need to be displayed for funding the "normal" programs of a channel. However, advertisements may alter the reception comfort of a user especially, but not exclusively, when the user is performing a channel selection navigation for switching to or searching for another program to watch, as indicated above.

In order to find a compromise between the necessity of displaying advertisements and an improvement of the program search efficiency during a channel selection navigation on the TV device AVD, a so-called "advertisement-play grace period" is created. During this advertisement-play grace period, no advertisement is displayed on the audio-video rendering device AVD, allowing the user to effectively and pleasantly look for and discover programs to watch.

When the user of the TV device AVD wants to look or search for another channel by performing a channel selection navigation, the beginning of this channel selection navigation is detected as the beginning of the advertisement-play grace period.

The channel selection navigation consists in selecting an Electronic Program Guide EPG, in selecting a mosaic viewing of channels or other similar content search features such as simply switching to another (second) channel via the trick play command controlled by the user of the TV device AVD.

The interception and analysis of the user trick play commands allows detecting what is being watched and how it is being watched, e.g. how long in time the second channel is being watched, viewed or previewed. The analysis of the trick play commands may therefore include a measurement of the duration of the channel selection navigation.

If the multimedia data transmitted on the second channel is of the advertisement predetermined content type, the multimedia content type controller ADIF takes the decision to start an advertisement-play grace period. Any advertisement programming is then prevented to be played by instructions of the advertisement control function with advertisement-play grace period mode of the multimedia content type controller ADIF.

During this advertisement-play grace period, corresponding to a predetermined time delay, multimedia data of the second content type, i.e. from the programs servers PGS or the previews servers PRS, is displayed on the TV device AVD in replacement of the advertisement then transmitted on the second channel.

In a preferred environment, the multimedia database(s) of the previews servers PRS includes special preview content related to respective programming content of multimedia database(s) of the programs servers PGS, and that allow providing the user with an effective preview program for the moments when the user is looking for something to watch. The special preview content is generally especially designed to provide effective program preview to attract a user more easily to watch the related programming or "normal" content from the programs servers PGS.

In other words, the multimedia data of the second content type provided by the previews servers PRS is in relation with multimedia data of the programs servers PGS to be transmitted on the second channel.

The program played to replace advertisements can also come from recent past program playtime cached for this purpose or from time-shift media storage or from the first seconds (minutes) of playtime of such programs.

At the end of the predetermined time delay or advertisement-play grace period, measured in seconds or minutes, the multimedia content type controller ADIF allows the multimedia data of advertisement predetermined content type, i.e. from the advertisements servers ADS, to be transmitted again.

On the other hand, as soon as it is detected that the user is satisfied by a certain channel, such as by detecting that the user selects this channel for viewing from the EPG or from the mosaic function, the advertisement-play grace mode is also suspended.

It is to be noted that the duration of the advertisement-play grace period can be configured or adapted to the user's behavior.

There is however no significant risk that users exploit this advertisement-play grace period mode to avoid advertisements altogether. If the user repeatedly changes channel as soon as advertisements start playing then, after a few minutes of this behavior, advertisements will start playing on all channels. This behavior is, however, not likely, according to user behavior reviews.

It is also to be noted that the method does not enforce a specific implementation such that several functional modules could be grouped in one or that certain functional modules could be split in sub-modules.

Also the functional modules may be deployed in the network, the ISP domain, the cloud, in customer premises infrastructures, and may be deployed at more than one place.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method to control the display of multimedia data on an audio-video rendering device, the multimedia data having a type of multimedia content and being transmitted on a channel received at said audio-video rendering device, wherein said method comprises:
   intercepting an action activated by a trick play command;
   analyzing the intercepted action of said trick play command;
   interpreting multimedia data transmitted on a second channel if said intercepted trick play command is determined by said analyzing to activate a channel selection navigation to said second channel;
   preventing the multimedia data transmitted on said second channel to be displayed on said audio-video rendering device if the transmitted multimedia data is interpreted to be an advertisement type; and
   displaying replacement multimedia data on said audio-video rendering device wherein said replacement multimedia data comprises at least one of preview content of a program being interrupted by said multimedia data of said advertisement type, a recent past program playtime of said program cached for this purpose and a first seconds or minutes of playtime of said program.

2. The method according to claim 1, wherein said channel selection navigation consists in selecting an Electronic Program Guide EPG via said trick play command controlled by a user of said audio-video rendering device.

3. The method according to claim 1, wherein said channel selection navigation consists in selecting a mosaic viewing of channels via said trick play command controlled by a user of said audio-video rendering device.

4. The method according to claim 1, wherein said channel selection navigation consists in switching to said second channel via said trick play command controlled by a user of said audio-video rendering device.

5. The method according to claim 1, wherein said method further comprises the allowing the multimedia data of said advertisement type transmitted on said second channel to be displayed on said audio-video rendering device after a predetermined time delay.

6. The method according to claim 5, wherein said method comprises measuring how long in time said second channel is selected on said audio-video rendering device, thereby determining if said predetermined time delay has expired.

7. The method according to claim 1, wherein the multimedia data transmitted channels are provided by servers, in that the multimedia data of said advertisement type is provided by a server of a first server type, and in that the multimedia data of said program being interrupted is provided by a server of a second server type.

8. A display control device for controlling the display of multimedia data on an audio-video rendering device associated with a user control, the multimedia data having a type of multimedia content and being transmitted on a channel received at said audio-video rendering device,
   said user control being adapted to activate a channel selection navigation, from a first channel to a second channel, on said audio-video rendering device, said display control device comprising:
   a user control command receiver adapted to intercept actions of said user control,
   a trick play command analyzer adapted to analyze whether an intercepted action of said user control requests a channel selection navigation,
   a search/discovery mode detector adapted to interpret a type of multimedia content transmitted on said second channel if said trick play command analyzer indicates said user control has activated a channel selection navigation, and
   a multimedia content type controller adapted to prevent the multimedia data transmitted on said second channel to be displayed on said audio-video rendering device if the multimedia data transmitted on said second channel is of an advertisement content type and display replacement multimedia data on said audio-video rendering device wherein said replacement multimedia data comprises at least one of preview content of a program being interrupted by said multimedia data of said advertisement type, a recent past program playtime of said program cached for this purpose and a first seconds or minutes of playtime of said program.

9. The control device according to claim 8, wherein said multimedia content type controller is coupled to at least one server adapted to provide said replacement multimedia data.

10. A method to control the display of multimedia data on an audio-video rendering device when navigation, from a first channel to a second channel, is activated by a trick play command associated to said audio-video rendering device, the multimedia data having a type of multimedia content and being transmitted on a channel received at said audio-video rendering device, wherein said method comprises:
   intercepting an action activated by said trick play command;
   analyzing whether the intercepted action of said trick play command activates a channel selection navigation;
   interpreting multimedia data transmitted on said second channel if said intercepted trick play command activates a channel selection navigation to said second channel; and preventing the multimedia data transmitted on said second channel to be displayed on said audio-video rendering device if the transmitted multimedia data is of a predetermined content type;
   displaying on said audio-video rendering device multimedia data of a second content type in replacement of the multimedia data of said predetermined content type, said second content type being distinct from said predetermined content type; and allowing the multimedia data of said predetermined content type transmitted on said second channel to be displayed on said audio-video rendering device after a predetermined time delay.

* * * * *